(No Model.) 3 Sheets—Sheet 1.
T. KING & R. WILSON.
APPARATUS FOR PRINTING, NUMBERING AND DELIVERING TICKETS.
No. 303,226. Patented Aug. 5, 1884.
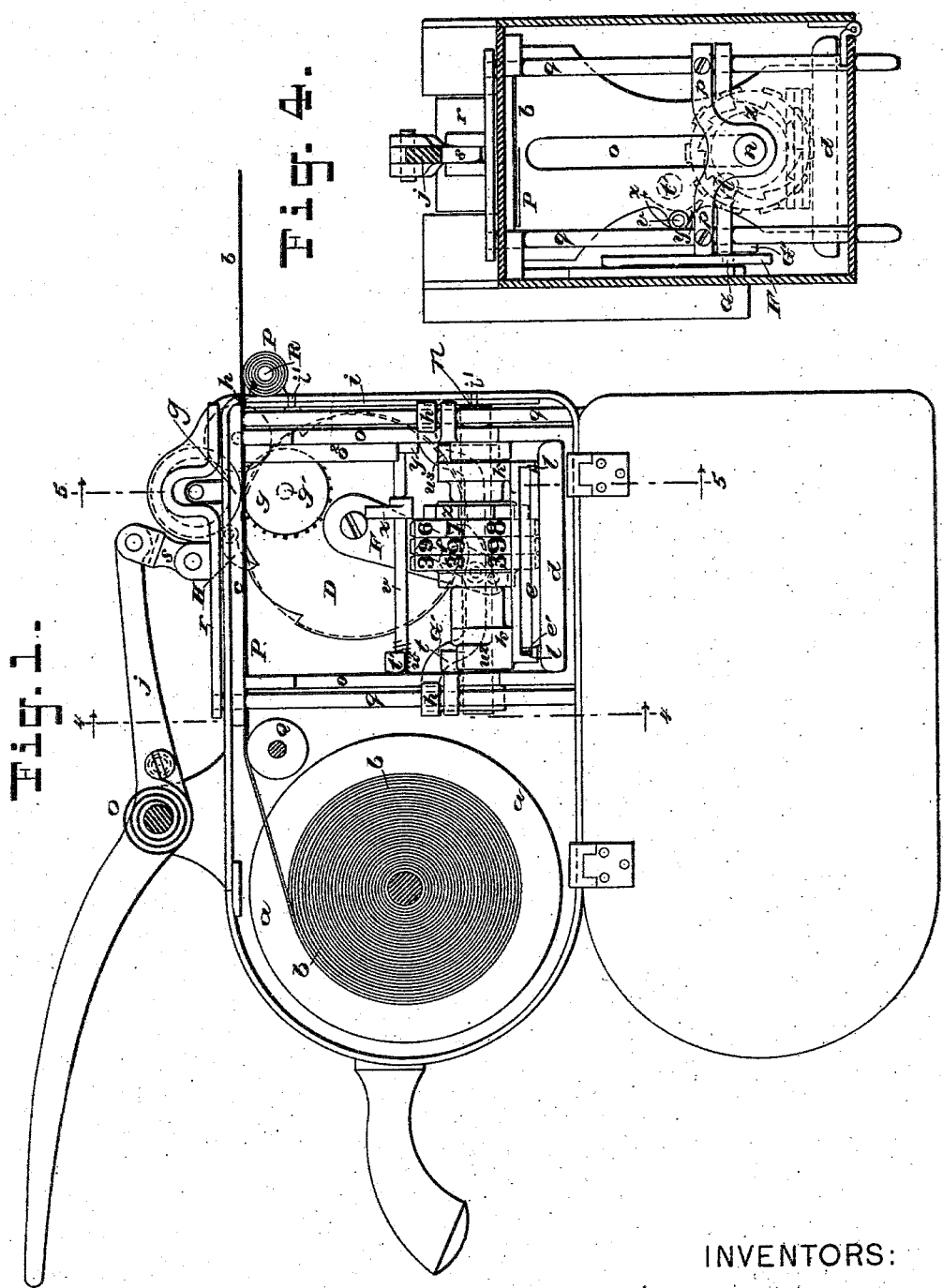

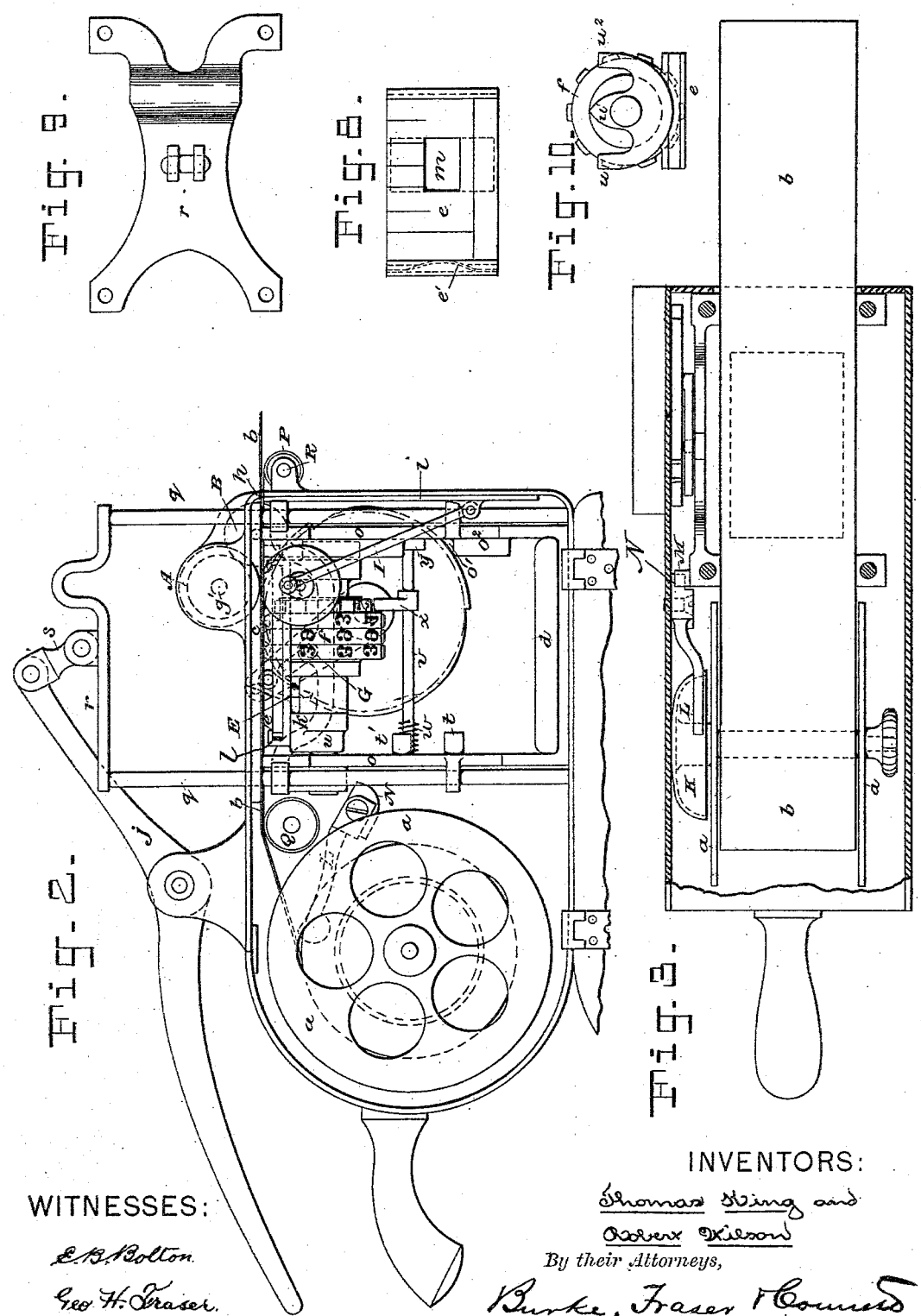

(No Model.)  3 Sheets—Sheet 3.
T. KING & R. WILSON.
APPARATUS FOR PRINTING, NUMBERING AND DELIVERING TICKETS.
No. 303,226.  Patented Aug. 5, 1884.
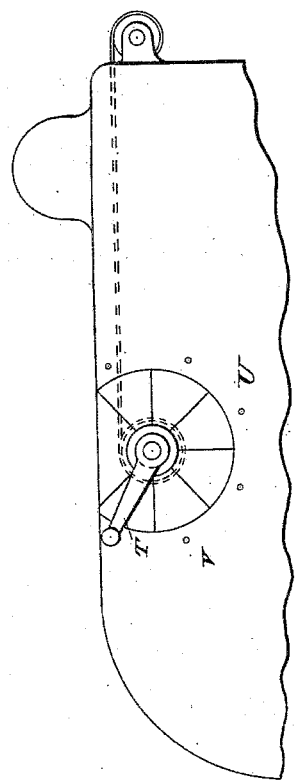
Fig. 6.
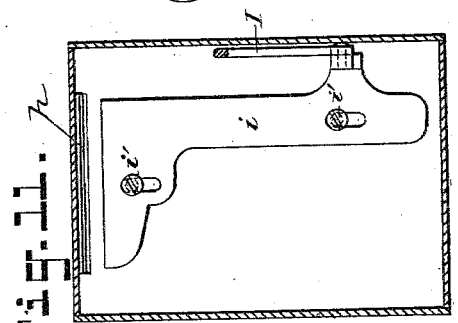
Fig. 7.
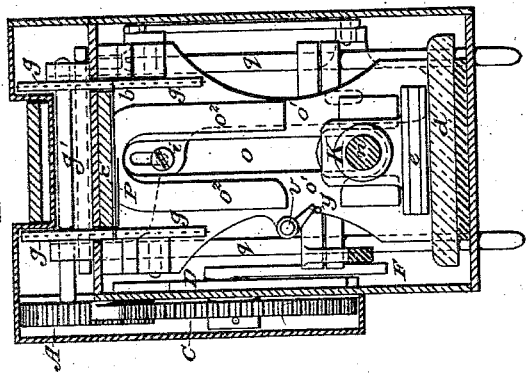
Fig. 5.
Fig. 11.
WITNESSES:
Geo. H. Fraser.
E. B. Bolton.
INVENTORS:
Thomas King and
Robert Wilson.
By their Attorneys,
Burke, Fraser & Connett

UNITED STATES PATENT OFFICE.

THOMAS KING AND ROBERT WILSON, OF LONDON, COUNTY OF MIDDLESEX, ENGLAND.

APPARATUS FOR PRINTING, NUMBERING, AND DELIVERING TICKETS.

SPECIFICATION forming part of Letters Patent No. 303,226, dated August 5, 1884.

Application filed April 2, 1884. (No model.) Patented in England July 24, 1883, No. 3,625.

*To all whom it may concern:*

Be it known that we, THOMAS KING and ROBERT WILSON, both of London, England, have invented certain new and useful Apparatus for Printing, Numbering, and Delivering Tickets for Tram-Cars or other Purposes, of which the following is a specification.

For the purpose of checking the receipts of fares by the conductors of tram-cars and omnibuses some proprietors provide their conductors with consecutively-numbered tickets and with a registering-punch for punching a small piece out of each ticket just before delivering it to a passenger; but as a distinct set of tickets is necessary for each distinct amount of fare the method is not convenient, and the punch, besides, will only register the total number of tickets punched, and not the number issued of each distinct value. This can only be ascertained by collecting the small punched-out pieces in separate lots and counting them. Other proprietors provide their conductors with an apparatus in which a reel has wound upon it a large number of tickets in the form of a long or continuous strip of paper. The conductor, by turning a handle, causes a ticket to protrude so that it can be torn off and given to a passenger. Then another ticket is caused to protrude in like manner, and so on; and it is usual for the conductor to mark each ticket with the amount of fare paid before tearing it off, the mark being registered by a second strip. This method is perhaps better than that first described; but in both the means of checking is unsatisfactory and the expense of previously printing the tickets has to be incurred.

Now, our invention consists in constructing a portable apparatus by which, through the action of the conductor, the tickets are printed, consecutively numbered, and delivered or presented in succession ready to be torn off. Our apparatus is composed, essentially, of a reel upon which a long strip of plain or unprinted paper is wound; of a platen under, upon, or against which the paper passes as it is drawn from the reel; of an inking-surface and a surface for printing the necessary words or matter on the tickets; of any ordinary numbering mechanism, by which the figures for printing in numerical succession are brought into position; of a pair of rollers for drawing along the strip of paper, and of a pair of nippers or jaws at the mouth of the apparatus, which open to allow as much of the strip as constitutes a ticket to pass, and then close on the strip, so as to allow the conductor to readily tear the ticket off. The apparatus is operated by the conductor by means of a lever or other contrivance, each movement of which in the one direction brings the printing-surface and numbering apparatus into contact with the paper, so as to print and number a ticket, while in the movement in the reverse direction, which may be effected by a spring or springs, the printing-surface and numbering apparatus are returned to contact with the inking-surface, (the figures of the numbering apparatus advancing one number in the well-known manner,) the drawing-rollers draw forward the paper and cause the ticket to protrude, the jaws opening to allow it to pass, and then closing upon it, all these operations being effected through the intermediation of any suitable gearing, as will be well understood. Every motion of the lever in the one direction may also be made to sound a bell. It will be seen that by our apparatus not only are the tickets printed and numbered by the action of the conductor without causing him any additional work, but there is also an efficient check on his receipts, because the apparatus is self-registering.

The annexed drawings represent an apparatus constructed according to our invention. Figure 1 is a sectional side elevation with the parts in their normal position, the side plate being shown open. Fig. 2 is a side elevation with the parts in the position they occupy when the printing-surface is in contact with the paper. Fig. 3 is a plan of the apparatus as seen from below the top plate. Figs. 4 and 5 are sections through the lines 4 4 and 5 5, respectively, of Fig. 1. Fig. 6 is a partial side elevation, and Fig. 7 a plan showing the metal band hereinafter described. Figs. 8, 9, 10, and 11 are detail views.

*a* is the reel containing the strip of paper *b*.

$e$ is the platen, under which the paper passes; $d$, the inking-surface; $e$, the printing-surface (shown separately in Fig. 8) for printing the necessary words on the tickets; $f$, the numbering mechanism, of ordinary construction; $g\,g$, the rollers for drawing along the paper $b$. $h$ is a fixed nipper or jaw, and $i$ a movable nipper. $j$ is the operating-lever. The parts above enumerated constitute the essential portions of the apparatus.

The printing-surface $e$ is carried by the lower part of a frame, $k$, which has guides $l\,l$ to receive said printing-surface, and there is a spring, $e'$, on $e$, to retain it in place. This frame $k$ also contains the numbering mechanism $f$. Those numbers which for the time being are to print project through a hole made for the purpose in the printing-surface $e$. (See $m$, Fig. 8.) The frame $k$ has a central spindle, $n$, on which it is free to turn. This spindle works in fixed vertical guides $o\,o$, and is attached at its ends to bars $p\,p$, fixed to vertical rods $q\,q$. These rods pass through the top plate of the apparatus, and are fixed to a plate, $r$, (shown separately in Fig. 9,) to which the lever $j$ is connected through the intermediation of a link, $s$. On one of the guides $o\,o$ are two tripping-pins, $t\,t'$, which, as the frame $k$ is being raised by means of the lever, cause this frame to turn over, together with the printing-surface $e$ and numbering mechanism, so as to bring them into position for printing. This turning of the frame $k$ is effected by means of teeth $u\,u'\,u^2$ thereon. (See Fig. 10, which is an end view of the frame $k$.) The two teeth $u\,u'$ are caught in the first part of the upward movement of the frame by the pin $t$, which turns the frame partly round. Then the two teeth $u'\,u^2$ are caught in the following part of the upward movement by the second pin, $t'$, which completes the turning movement of the frame. These tripping appliances may be repeated at the opposite end of the frame $k$; but we do not consider this necessary. We, however, think it desirable to fit to the opposite end a cam-shaped boss, $u^3$, which, by working against the edges of an opening, $o'$, in a bar, $o^2$, during the turning of the frame $k$, assists the turning movement. $v$ is a spindle mounted between the guides $o\,o$, and fitted with a spring, $w$, which tends to turn it on its axis, so as to keep a pawl, $x$, which is keyed thereon, in its normal position. A tail-piece, $y$, by abutting against a stop, prevents the spindle turning too far. The pawl $x$ is for causing the advance of the numbering mechanism to the extent of one unit during each descent of the numbering mechanism. This is effected by the pawl catching, during the said descent, the ratchet-wheel $z$ of the numbering mechanism and turning it one tooth. In the upward movement of the numbering mechanism the spring $w$ allows the pawl to yield under the pressure of the wheel $z$. The rollers $g\,g$ for drawing the paper are each composed of a pair of disks, as shown, connected by spindles $g'\,g'$. One pair of disks, preferably the lower, has pins or points in its periphery, and the other pair has corresponding holes, these pins and holes being for the purpose of taking hold of the paper $b$. The upper roller, $g$, is driven by toothed wheels A B C, the wheel C being on the same spindle as a ratchet-wheel, D. This wheel D, and consequently the rollers $g\,g$, are rotated one step at every descent of the front end of the lever $j$ by means of a pawl, E, carried by an arm, F, which, in the ascent of the frame $k$, is carried up by a pin, G, on a cross-bar, G', of this frame into the position seen in Fig. 2, the arm F having a slot, as shown, for the pin G to ride in. In the descent of the frame $k$ the pawl E takes into the ratchet-wheel D and rotates it the distance of one tooth.

H is a stop-pawl to prevent the wheels A B C D being rotated in the reverse direction. The movable nipper $i$ is shown in front elevation in Fig. 11. It is actuated by a rod, I, from a crank on the axis of the lower roller, $g$, and slides on guide-pins or screws $i'\,i'$ on the front plate of the apparatus. When the rollers $g$ begin to rotate, the jaw $i$ moves down clear of the fixed jaw $h$ and allows the paper $b$ to pass, and by the time the rollers $g$ have completed their rotation the jaw $i$ has risen and again nips the paper against the jaw $h$.

K is a bell whose striker L is lifted on every descent of the frame $k$ by a projection, M, coming against the tail N. As soon as the parts M and N are clear of each other the striker falls upon the bell.

O is a spring to return the operating-lever $j$ and through it all the mechanism to their normal positions when the pressure has been removed from it.

In routes where there are what are called "overlapping fares" it is desirable to show by the tickets themselves at what part of the route the various tickets are issued—viz., before reaching station 2, or before reaching station 3, &c. Where this is required we employ a very thin spring band of metal, P, connected at one end to a roller, Q, and at the other to a spindle, R. This band passes immediately below the strip of paper $b$, toward one side thereof. In this band is an aperture, S. The type of the printing-surface $e$ can therefore not print upon that part of the paper which is above the band P, except upon so much as is exposed by the aperture S. On the spindle of the roller Q is a handle, T, Figs. 6 and 7, with a spring-catch to take into the holes U U, Fig. 6. On reaching each successive station the attendant, by moving the handle round to the next hole U, will draw the band P an equivalent distance, thereby shifting the position of the aperture S relatively to the printing-surface. By noticing what particular words or figures have been printed on the ticket through the aperture S, it will be found at what part of the route the ticket was issued. The printing-surface is of elastic, yielding material, in order that it may be pressed through the apertures in the band P.

It will be evident that our portable apparatus for printing, numbering, and delivering tickets can be modified in various ways without departing from our invention; but the arrangement we have described, and shown in the drawings, is that which we prefer for the purpose.

We claim—

1. The combination, in a machine for printing, numbering, and delivering tickets, of the reel for the paper, the platen, the inking surface or pad, a reversible frame carrying a printing-surface and numbering mechanism, constructed and arranged to operate substantially as described, the drawing-rollers to feed the paper, the nippers to grasp the strip and hold it while it is being torn off, and mechanism, substantially as described, for connecting the printing and feeding devices and operating the moving parts, all arranged substantially as set forth.

2. The combination, in a machine for printing, numbering, and delivering tickets, of a reel, a, a fixed platen, c, roughened drawing-rollers g, an inking surface or pad, d, a reversible frame carrying a printing-surface, e, and numbering mechanism f, rotatively mounted and constructed to turn as they are raised, a fixed jaw, h, and movable nipper i, an operating-lever, j, and the mechanism, substantially as described, whereby the paper is fed, the printing is effected, and the paper nipped through the medium of a single operation of the handle j, as and for the purposes set forth.

3. In an apparatus for printing, numbering, and delivering tickets, as set forth, the combination, with the printing device, the impression-surface of which is of yielding material, of the apertured band P, all constructed and arranged to operate substantially as and for the purposes set forth.

In witness whereof we have hereunto signed our names in the presence of two subscribing witnesses.

THOMAS KING.
ROBERT WILSON.

Witnesses:
GEORGE C. BACON,
JOHN W. WILLIAMS, Junr.